United States Patent
Singhal et al.

(10) Patent No.: US 8,250,573 B2
(45) Date of Patent: Aug. 21, 2012

(54) AUDIO SUBSYSTEM SHARING IN A VIRTUALIZED ENVIRONMENT

(75) Inventors: Abhishek Singhal, Santa Clara, CA (US); Kumar K. Chinnaswamy, Hillsboro, OR (US); Devon Worrell, Folsom, CA (US); Nitin V. Sarangdhar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1238 days.

(21) Appl. No.: 11/965,595

(22) Filed: Dec. 27, 2007

(65) Prior Publication Data

US 2009/0171677 A1 Jul. 2, 2009

(51) Int. Cl.
*G06F 9/455* (2006.01)

(52) U.S. Cl. ............................................ 718/1; 710/306

(58) Field of Classification Search .............. 718/1, 102; 710/306

See application file for complete search history.

(56) References Cited

U.S. PATENT DOCUMENTS

| | | | |
|---|---|---|---|
| 6,823,418 B2* | 11/2004 | Langendorf et al. | 710/306 |
| 2003/0187904 A1* | 10/2003 | Bennett et al. | 709/1 |
| 2006/0136912 A1 | 6/2006 | Robinson et al. | |
| 2007/0038997 A1 | 2/2007 | Grobman et al. | |
| 2007/0044100 A1* | 2/2007 | Panesar et al. | 718/102 |
| 2007/0067151 A1* | 3/2007 | Fiedler et al. | 703/25 |
| 2007/0288228 A1 | 12/2007 | Taillefer et al. | |
| 2008/0005297 A1* | 1/2008 | Kjos et al. | 709/223 |

FOREIGN PATENT DOCUMENTS

EP 0597381 * 4/1993

OTHER PUBLICATIONS

Hummel, Mark. "IO Memory Management Hardware Goes Mainstream." Presented Publicly May 23, 2006. 20 pages.
Abramson, Darren, et al. "Intel Virtualization Technology for Directed I/O". Intel Technology Journal, vol. 10, Issue 3. Aug. 10, 2006. 16 pages.
"High Definition Audio Specification", Intel, Initial Release, XP-002389409, Apr. 15, 2004, 174 pages.

* cited by examiner

*Primary Examiner* — Diem Cao
(74) *Attorney, Agent, or Firm* — Schwabe, Williamson & Wyatt, P.C.

(57) ABSTRACT

A device, method, and system are disclosed. In one embodiment the device includes a first virtual machine to directly access a physical audio codec. The device also includes a virtual audio codec that is managed by the first virtual machine. The virtual audio codec can provide a custom interface to the physical audio codec for one or more additional virtual machines apart from the first virtual machine.

24 Claims, 4 Drawing Sheets

AUDIO SUBSYSTEM SHARING IN A VIRTUALIZED ENVIRONMENT

FIELD OF THE INVENTION

The invention relates to sharing an audio subsystem in a computer system between multiple virtual machines running on the computer system.

BACKGROUND OF THE INVENTION

Virtualization is a mechanism to share of some/all resources/capabilities in available in a computer system between multiple virtual machines (VMs) resident in the computer system. A VM is a software implementation of a machine (computer) that executes programs like a real machine.

In many computer systems that implement virtualization, a general purpose operating system (OS), such as Microsoft® Windows®, may run in a VM on one partition in the system. A general purpose OS, hereafter referred to as capability OS, a COS is an operating system that is independently capable of managing all resources on a computer system and providing all services to applications and lower level software. Certain functionalities in the computer system are critical to maintain operation even through a capability OS (COS) crash. One application that should be able to withstand a COS crash is a voice over internet protocol (VoIP) application. A VoIP application would benefit from this to allow a phone conversation to continue even through a COS crash. This would require the VoIP application to run outside of the capability OS partition.

As it becomes more common for different voice and audio applications to run in multiple VMs/partitions on computer systems, contentions for the use of audio peripherals in any given system may rise. In many instances there are multiple VMs with applications running on each VM that need access to the audio peripherals through a discrete audio codec. Additionally, in many of these systems, a discrete high definition (HD) audio codec chip operates in coordination with an audio controller chip to manage the use of audio peripherals in the system.

BRIEF DESCRIPTION OF THE DRAWINGS

The present invention is illustrated by way of example and is not limited by the drawings, in which like references indicate similar elements, and in which.

DETAILED DESCRIPTION OF THE INVENTION

Embodiments of a method, device, and system to share the audio subsystem in a virtualized environment are described. In the following description, numerous specific details are set forth. However, it is understood that embodiments may be practiced without these specific details. In other instances, well-known elements, specifications, and protocols have not been discussed in detail in order to avoid obscuring the present invention.

Figure 1:
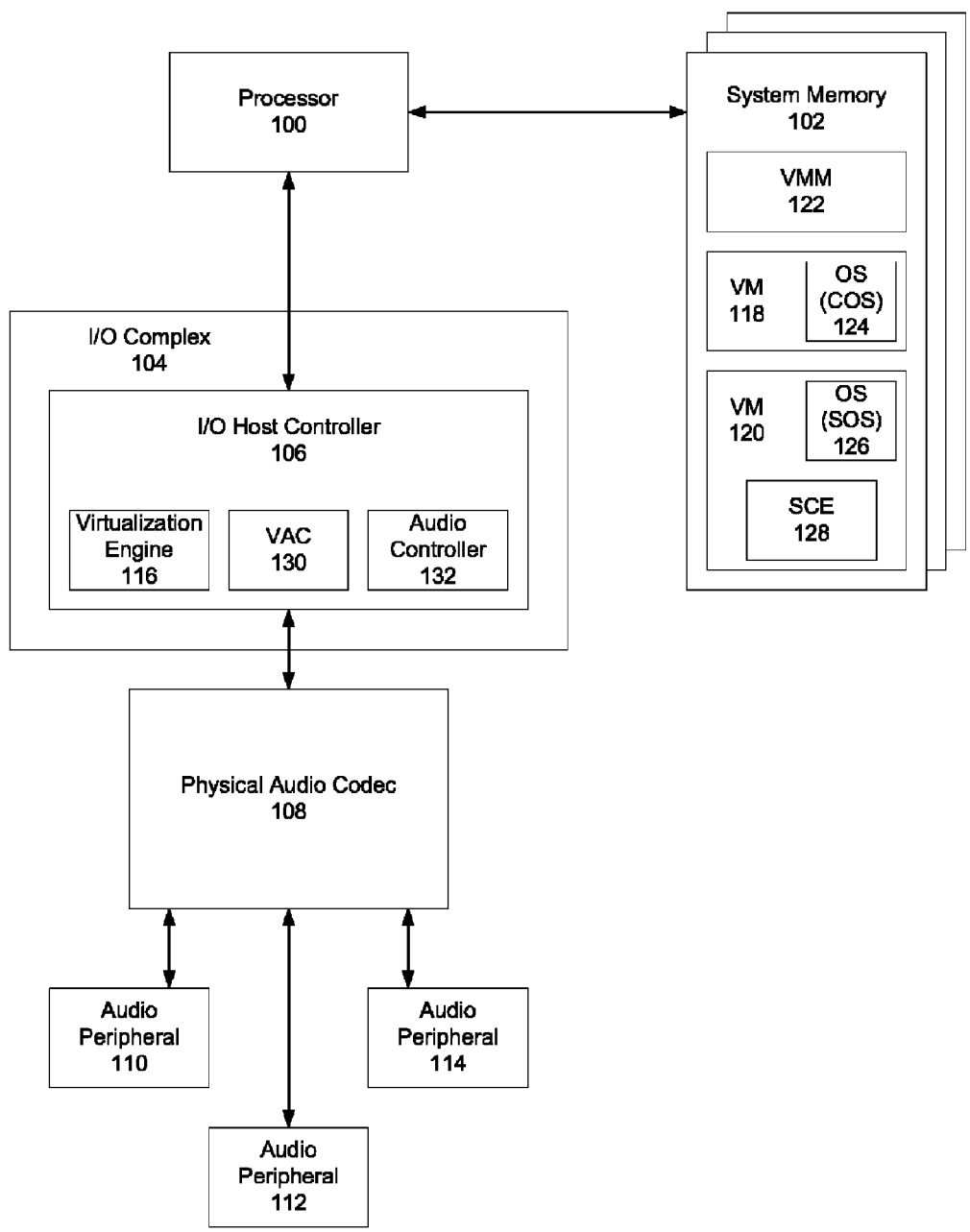
FIG. 1 describes one embodiment of a computer system that is capable of providing a custom interface to a physical audio codec for multiple virtual machines running on the system.

FIG. 1 describes one embodiment of a computer system that is capable of providing a custom interface to a physical audio codec for multiple virtual machines running on the system. The computer system shown in FIG. 1 is just an illustrative example of one of many possible computer systems that may include the many embodiments discussed below in FIGS. 1-4. This figure should not be viewed as restrictive to limiting one or more of the embodiments to a computer system with these particular components arranged in this way. Turning now to FIG. 1, the computer system includes a processor 100. In different embodiments, the processor may include one or more processor cores. In some multiprocessor embodiments, there are multiple processor dies coupled together, each including one or more cores per die (the architecture for processor cores on multiple dies is not shown in FIG. 1). In different embodiments, the processor 100 may be any type of central processing unit (CPU) designed for use in any form of personal computer, handheld device, server, workstation, or other computing device available today.

In many embodiments, the processor is coupled to system memory 102. A memory controller controls access to system memory 102. In some embodiments, the memory controller is integrated into the processor 100. In other embodiments, the memory controller is located in a discrete integrated circuit in the system. The memory controller is not shown in FIG. 1. In different embodiments, system memory 102 may be comprised of specific types of dynamic random access memory (DRAM), such as, for example, double data rate (DDR) synchronous DRAM. In other embodiments, system memory 102 may be comprised of other memory type devices.

The processor 100 is also coupled to I/O (input/output) complex 104. In many embodiments, I/O complex includes one or more integrated I/O host controllers. Each I/O host controller may control one or more I/O links (i.e. interconnects, buses). Each link may couple the I/O Complex to one or more I/O devices, external controllers, codecs, etc. One such host controller is I/O host controller 106. In some embodiments, I/O host controller 106 is a PCI Express® host controller. In other embodiments, I/O host controller 106 may utilize an alternative protocol. In many embodiments, a discrete physical audio codec (PAC) chip 108 is coupled to the host controller 110 to control the audio subsystem within the computer system, including any audio peripherals attached to the computer system, such as audio peripherals 110, 112, and 114.

In many embodiments, the computer system described in FIG. 1 has multiple virtual hardware partitions. In many embodiments, a virtualization engine 116 helps manage the different hardware partitions. In some embodiments, virtualization engine 116 is integrated into I/O host controller 106. In other embodiments, virtualization engine 116 is integrated elsewhere into the I/O complex 104 (not shown). In yet other embodiments, virtualization engine 116 is located elsewhere in the computer system such as in an additional discrete integrated circuit (not shown).

In certain other embodiments, the hardware partitions are managed through software running in the system memory or firmware (not shown) and, therefore, do not require a virtualization engine.

In the embodiments where the system has multiple hardware partitions, each partition runs on a virtual machine (VM)

that is resident in system memory 102. For example, in a two partition system, VM A (118) and VM B (120) may both be residing within system memory 102. In this example, a portion of system memory 102 is allocated for VM A and a separate portion of system memory 102 is allocated for VM B. These two portions of memory are utilized solely by their respective VMs, thus these portions are not shared between the two VMs. Additionally, a virtual machine manager (VMM) 122 also may be resident in system memory to manage these allocations and the two VMs.

In many embodiments, there is a separate operating system (OS) running within the memory space of each of the two VMs, such as OS 124 running within VM A and OS 126 running within VM 126. In many embodiments, one of the two OS's, such as OS 124, is a capability OS (COS). A COS can be thought of as a fully functional standard OS such as Microsoft® Windows or Linux. Thus, the COS is an operating system that is independently capable of managing all resources on a computer system and providing all services to the application and lower level software. Additionally, in many embodiments, the other OS, here OS 126, is a service OS (SOS). A SOS, in many embodiments, is a limited functionality OS that has a very specific purpose (or purposes). For example, in some embodiments the SOS may run a voice over internet protocol (VoIP) engine. This would allow the VoIP engine to have a significant portion of the computer system's compute time regardless of the state of the COS. In other embodiments, the SOS can be a COS that is dedicated to one or more particular functions instead of being utilized as a general purpose operating system.

In many embodiments, the SOS runs a software codec emulator 128 (SCE) that also resides within VM 126. The SCE 128 is a software run by the SOS that manages a hardware codec.

A virtual audio codec 130 (VAC) is also present in the system. The VAC 130 can enable sharing of audio peripherals and audio functions among multiple VMs. This minimizes or eliminates contention of the single PAC 108 among the multiple VMs vying for the PAC's time. Specifically, the VAC 130 virtualizes the audio peripherals so each VM (or each OS running within each VM) attempting to utilize any of the audio peripherals will get a unique virtual copy of the peripherals. Additional VAC 130 logic arbitrates between the OSs to give each OS a certain portion of time to utilize each of the peripherals. One method of arbitrating portions of time between OSs is to utilize time division multiplexing.

In many embodiments, the VAC 130 is implemented in hardware. In different hardware implementations the VAC 130 may be integrated into the I/O host controller 106, the virtualization engine 116, or elsewhere in the computer system either as integrated logic within another chip or as discrete logic within its own chip. In other embodiments, all or portions of the VAC 130 are implemented in software (not shown). For example, in some VAC 130 software implementations the VAC 130 may be implemented in its own separate VM. In yet other embodiments, portions of the VAC 130 are implemented in hardware and other portions of the VAC 130 are implemented in software.

In many embodiments, the VAC 130 consists of a set of registers which maintain a copy of the set of configuration registers in the PAC 108 and a decision engine to enable interaction with VM B. The VAC 130 can only be programmed by VM B. Thus, VM A and any other VMs on the system have no visibility into the VAC 130. The VAC 130 is described in detail below in regard to FIG. 2.

In many embodiments, a host audio controller 132 is integrated into I/O host controller 106. In other embodiments, the audio controller 132 is discrete from the host controller and/or integrated into another chip in the computer system. For example, the audio controller 132 may be a controller for a high definition audio-based subsystem.

In many embodiments, there may be more than two VMs and two OSs present in the system (the embodiments where there are more than two VMs are not shown in FIG. 1).

Figure 2:
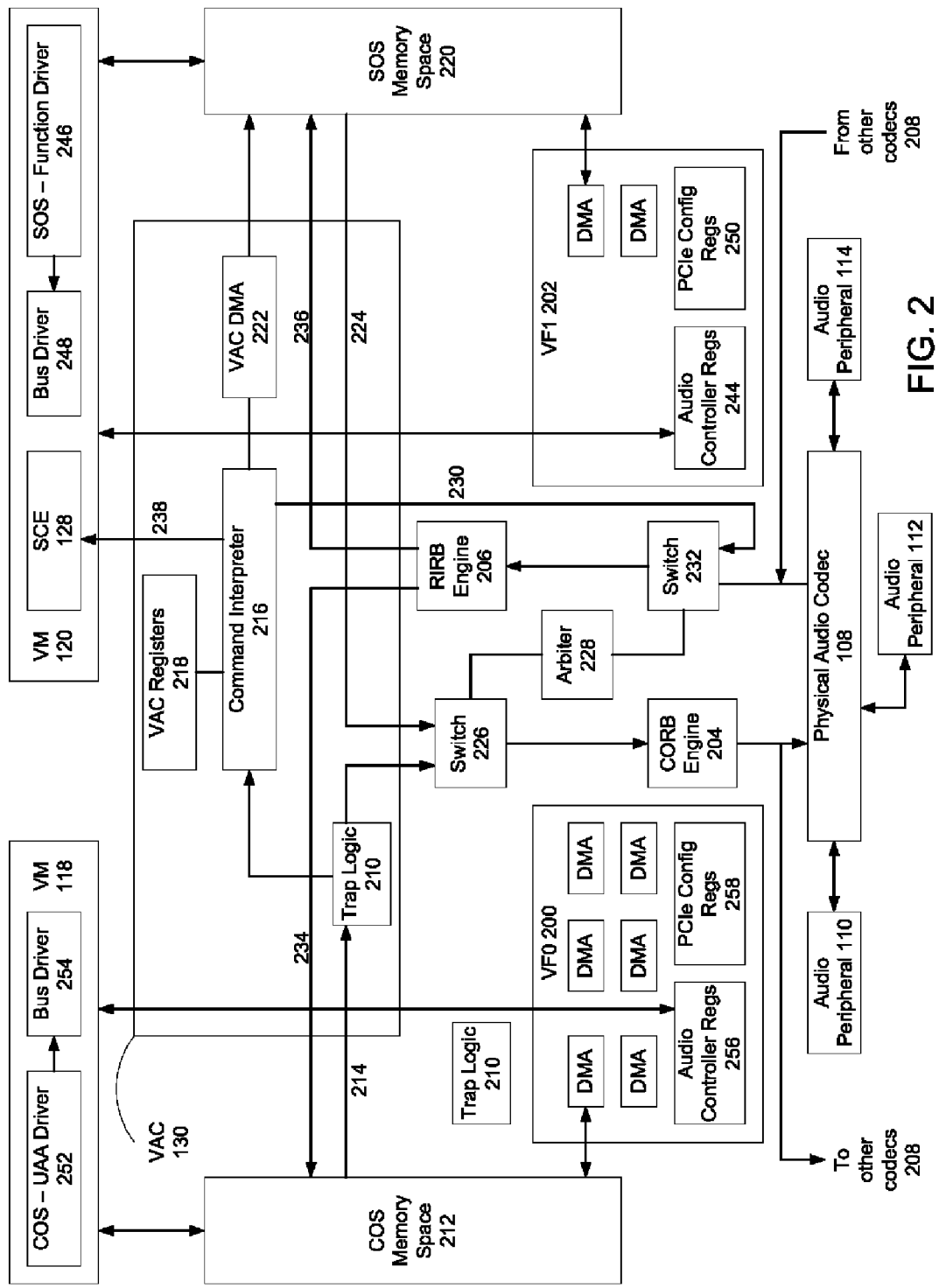
FIG. 2 describes one embodiment of the virtual audio codec.

FIG. 2 describes one embodiment of the virtual audio codec (VAC). The VAC 130 is shown as the large dotted line box. Virtual function zero 200 (VF0), and virtual function one 202 (VF1) are also shown as dotted lines. In FIG. 2, VF0 200 is utilized by the COS VM A (118) and VF1 202 is utilized by the SOS VM B (120). Each virtual function (VF) includes the portion of the audio controller (132 in FIG. 1) that is dedicated to each of the two OS's. For example, in many embodiments, the audio controller has eight total DMA (direct memory access) engines, of which 6 of them are dedicated to the COS resident in VM A and 2 of them are dedicated to the SOS resident in VM B. The discrepancy between the number of DMA engines dedicated to each of the two OS's is associated with the memory access requirements of the functions associated with each OS. As mentioned above, the SOS is dedicated to a limited number of functions while the COS is a fully functional OS. Thus the COS may have other codecs, such as an HDMI codec and a modem codec among others, apart from the audio codec, that it needs to manage. These additional codecs also require DMA engine accessibility to the memory. In some embodiments, the DMA engines will be split in number according to the relative amount of data usually transferred by the COS versus the SOS.

In many embodiments, logic within VAC 130 includes trap logic 210, command interpreter 216, VAC registers 218, VAC direct memory access (DMA) engine 222, and switches 226 and 232. These logic devices are described in detail below.

VF0 200 and VF1 202 each have a copy of the audio controller registers and a copy of PCI configuration registers. In some embodiments, the audio controller is located on a PCI Express® link. In some embodiments, the DMA engines will be split in number according to the relative amount of data usually transferred by the COS versus the SOS. For example, in the embodiment shown in FIG. 2, the COS is allocated six audio controller DMA engines in VF0 202 and the SOS is allocated two audio controller DMA engines in VF1 204.

Additional DMA engines called the command output ring buffer 204 (CORB) and the response input ring buffer 206 (RIRB) are also shown in FIG. 2. The CORB and RIRB engines provide access directly between COS and SOS memory space and the set of physical codecs present in the system. Thus, commands sent to the PAC 108 as well as other codecs 208 are physically sent by the CORB engine 204 and responses received from the PAC 108 as well as from other codecs 208 are physically received by the RIRB engine 206.

In many embodiments, the VAC 130 has the capability to present a set of virtual audio codec registers to the COS. Thus, when the COS attempts to access the PAC 108, instead of gaining access directly to the PAC 108, the COS sees a virtual copy of the registers. There is logic on the I/O host controller (106 in FIG. 1) which traps COS requests to the PAC 114 and provides a simpler VAC 130 view to the COS. The COS has no visibility into the PAC 108 hardware on the platform.

The VAC 130 has trap logic 210 that snoops commands sent from the COS memory space 212 on command path 214. During the course of normal system operation, the COS will send numerous commands to multiple codecs, such as the audio codec, HDMI codec, modem codec, etc. The VAC 130 only handles commands and responses related specifically to the PAC 108. Commands and responses related to the non-audio codecs are passed through the trap logic 210 to CORB DMA engine 204. When the COS specifically targets the PAC 108 with a command, the trap logic 210 traps the command and sends it to a command interpreter 216. The command interpreter 216 will see that the command is trying to access the PAC 108 and depending on what the command is, the command interpreter will respond accordingly.

The command interpreter 216 has a set of VAC registers 218. This set of registers includes copies of all relevant PAC 108 registers for each of the OS's that would normally interface with the PAC 108. If the command from the COS is a write to a PAC 108 register, the command interpreter 216 will perform the write to the respective VAC register that corresponds with the COS-version of that PAC 108 register. If the register write that occurs would require a modification in the PAC 108 configuration, the command interpreter 216 notifies the SOS by sending the command to SOS memory space 220 through a VAC DMA engine 222. For example, a format command or an in/out enable command would require modifications to the PAC 108 configuration. In many embodiments, the VAC DMA engine 222 utilizes a register (not shown) that points to the location in SOS memory space 220 where to transfer the COS commands, that are passed through the command interpreter 216, which need SOS intervention.

In many embodiments, if the COS attempts to modify the CORB write pointer register (offset 48h in the Intel® High Definition Audio Specification), which would indicate that one or more PAC 108 CORB entries need to be updated, the command interpreter 216 would need to send this request to the SOS so the SOS could respond accordingly as well as modify the PAC 108 configuration when needed. In many embodiments, a write access to the CORB control register (offset 4Ch in the Intel® High Definition Audio Specification) would also be monitored by the command interpreter 216 to determine when the CORB DMA run bit is being set.

When the PAC 108 configuration requires modification, once the SOS becomes aware of the request from the command interpreter 216, the SOS can then send a specific command targeting the PAC 108 across command path 224. Switch 226 receives the command and determines when to send the command to the PAC 108. Arbiter 228, coupled to switch 226, determines the order of commands sent to the PAC 108. As mentioned, commands sent specifically to the PAC 108 as well as commands sent to the other codecs are sent through the CORB engine 206. In some embodiments, arbiter 228 is a simple round robin arbiter. In other embodiments, a different type of arbiter is utilized. Switch 226 receives commands targeting the PAC 108 from SOS memory 220 across command path 224 and receives commands targeting any other codec within the system from trap logic 210 (i.e. trap logic 210 just allows non-audio codec commands from the COS to pass through directly to switch 226).

If there is a read access command from the COS to a PAC 108 register, the trap logic 210 again snoops the read command originating from COS memory space 212. The trap logic sends the PAC-targeted read command to the command interpreter 216. The command interpreter then accesses the COS-version of that PAC 108 register in the VAC registers 218 and sends the virtual response (i.e. the retrieved virtual register data) across response path 230 to switch 232. Switch 232 also receives responses from the PAC 108.

Switch 232 switches between inbound PAC 108 responses and inbound command interpreter 216 virtual responses using additional arbitration logic within arbiter 228. The arbitration logic within arbiter 228 determines which responses to operate on. Additionally, arbiter 228 also assists switch 232 with targeting the correct memory space (COS or SOS) based on addressing information received from the responses. Arbiter 228 also may keep track of the sequence of requests from the SOS and COS being sent through switch 226 and can potentially determine the response path using request information. The PAC 108 responses are received from the PAC 108 through the RIRB engine 206. Switch 232 routes the responses received from the RIRB engine 206 to either COS memory space 212 on response path 234 or SOS memory space 220 on response path 236. The destination memory space is dependent upon the response received. All non-PAC 108 responses are sent to COS memory space 212 while PAC 108 responses are routed to either COS or SOS memory space, depending upon the type of response.

Specifically, for PAC responses, if the response is from the physical PAC 108, then the response is routed to the SOS memory space 220. If the response is a virtual response received from command interpreter 216, the virtual PAC response is routed to the COS memory space 212.

In response to certain commands initiated from the COS that are targeting the PAC 108, the command interpreter 216 will generate an interrupt to the SOS. In many embodiments, an interrupt generated by the command interpreter 216 may be sent across interrupt path 238 to a software codec emulator (SCE) 128 residing in the SOS VM B. The SCE 128 then will send an update to the VF1 audio controller registers 244 to reflect the interrupt in the registers. In many embodiments, the VF1 audio controller registers 244 are located within the audio controller (132 in FIG. 1). Additionally, in many embodiments, a basic input/output system (BIOS) may program an interrupt advanced programmable interrupt controller (APIC) to set the appropriate address mapping for the generated interrupts described above (the APIC is not shown).

The VAC 130 is dynamically programmable, which allows custom capabilities to be exposed per VM. For example, a first VM may only see speakers connected to the codec while a second VM may only see a headset connected to the codec. To maintain strict control of the VAC 130 only the SOS VM B may program the VAC 130. Programming of the VAC 136 may be accomplished through a function driver 246 running in the SOS. In many embodiments, when the audio controller (138 in FIG. 1) sits on the PCI Express® bus interface, a PCI bus driver 248 may be utilized in conjunction with the SOS function driver 246, both running on VM B, to send information to (and receive information from) the VF1 audio controller registers 244, the VF1 PCI Express® configuration registers 250 in the I/O host controller (106 in FIG. 1), as well as to the VAC 130 customizable configuration per VM, located in SOS memory space 220. In other embodiments, a separate smart driver may be implemented to run on VM B for the specific purpose of programming the VAC 130 (the smart driver is not shown).

Using the same driver functionality, the COS has visibility to the VF0 audio controller and host controller through VM A. In many embodiments, a universal audio architecture (UAA) driver 252, running on VM A, may be utilized in conjunction with PCI bus driver 254 to send information to (and receive information from) the VF0 audio controller registers 256 and/or the VF0 PCI Express® configuration registers 258. Though, the COS does not have visibility to the VAC 130 configurations.

In some embodiments, once VM B is configured as a master VM, VM B and the SOS running on it have direct access to the physical hardware of the PAC 108, all other VMs (and respective OSs) see independent copies of a virtual set of the audio codec's registers. In other embodiments, each VM can have its own implementation of a virtual codec and underlying hardware or software (such as the VMM 122) manage the arbitering between VMs.

Figure 3:
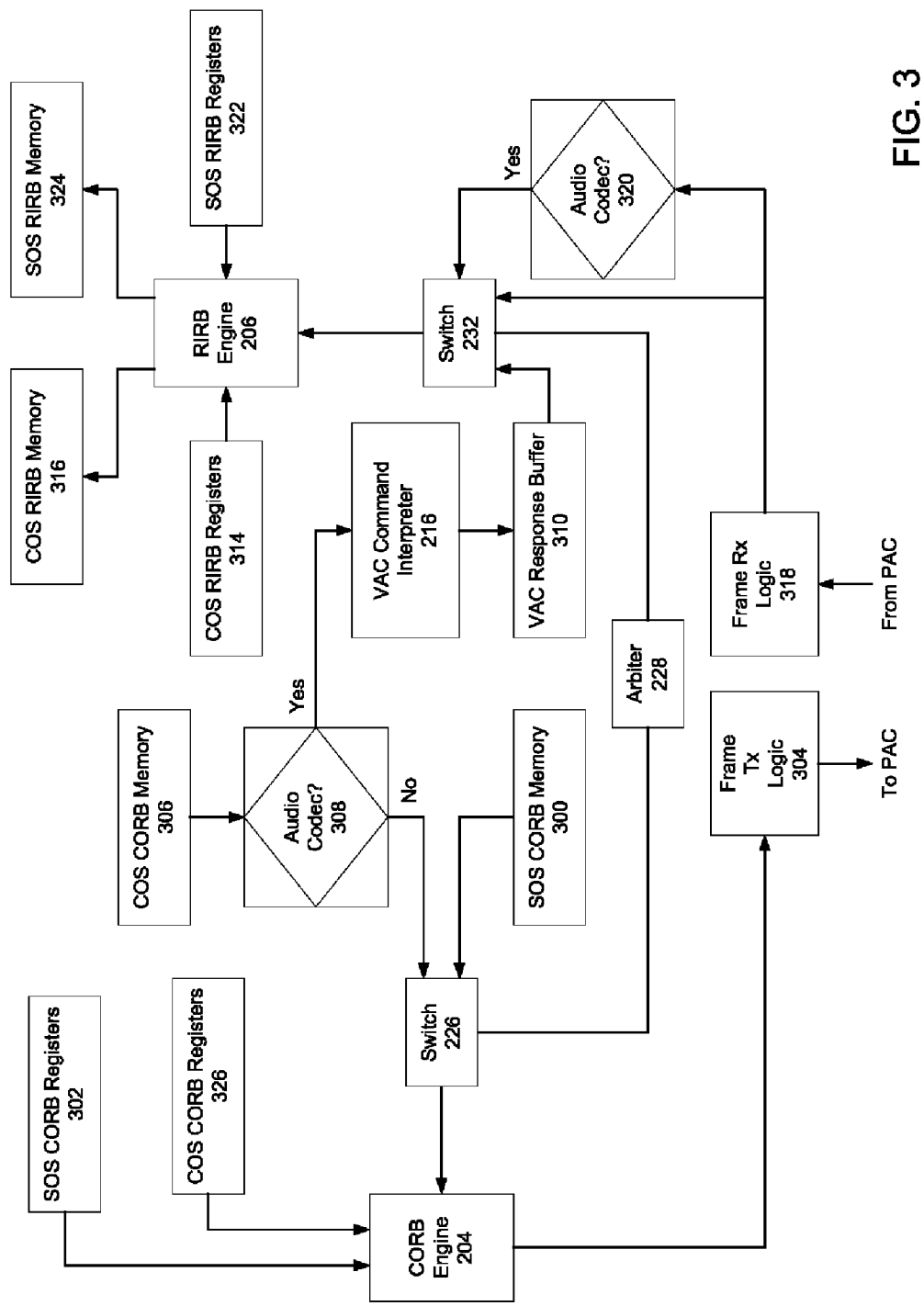
FIG. 3 describes one embodiment of the command output ring buffer and response input ring buffer handling logic in greater detail.

FIG. 3 describes one embodiment of the CORB/RIRB handling logic in greater detail. To best illustrate the CORB/RIRB handling logic, a walkthrough of each potential request and response is discussed below. In many embodiments, both the CORB and RIRB DMA engines have assigned memory space as well as registers for operation. This memory space and the registers are virtualized so both the COS and the SOS have their own copies.

When a request command is sent from the SOS to the PAC 108, the command initiates in the SOS CORB memory space 300. In many embodiments, one or more SOS CORB registers 302 are modified to provide information regarding the command. The command arrives at switch 226, which utilizes arbitration logic within arbiter 228 to determine which command is the next to be sent to the CORB engine 204. The other input to the switch 226 is the command path for non-audio codec commands originating from the COS (these commands will be discussed in greater detail below). In some embodiments, arbitration logic within arbiter 228 utilizes a round robin scheme for arbitrating whether the SOS command or COS command is sent next. Once the command is granted its turn by the arbitration logic, it is then sent to the CORB engine 204. The CORB engine 204 receives the command and also receives information from the SOS CORB registers 302 such as transmission parameters (e.g. a write pointer). Next, the CORB engine 204 sends the command to frame transmission (Tx) logic 304 and the command is then transmitted to the PAC 108.

Alternatively, when a request command is sent from the COS CORB memory space 306, a different process is utilized to determine whether to send the command to the PAC 108. If the COS-initiated command is targeting a non-audio codec, then the command is let through. Otherwise, if the COS-initiated command is targeting the PAC 108, the command is not sent to the PAC 108, but rather a separate process is utilized. The COS CORB memory space 306 is a certain portion of the greater COS memory space (212 in FIG. 2). The command sent from the COS CORB memory space 306 reaches a decision engine 308, this decision engine determines whether the command is targeting the PAC 108. In many embodiments, decision engine 308 is located inside of trap logic (210 in FIG. 2). If the command is not targeting the PAC 108, then the command is passed through to the switch 226. The switch 226 utilizes arbitration logic within arbiter 228 to determine which command is the next to be sent to the CORB engine 204. Once the arbitration logic grants the command its turn, then the command is sent to the CORB engine 206. The CORB engine 206 receives the command and also receives information from the COS CORB registers 326 such as transmission parameters (e.g. a write pointer). Next, the CORB engine 204 sends the command to frame transmission (Tx) logic 304 and the command is then transmitted to the PAC 108.

If the COS CORB memory space 306 command is targeting the PAC 108, then the decision engine 308 sends the command to the VAC command interpreter 216. The command interpreter 216 (the functionality of which is described in detail above in regard to FIG. 2) modifies the command from a command that is targeting the PAC 108 to one that targets the VAC and then sends the command to the VAC response buffer 310. The VAC response buffer 310 allows commands to be buffered while waiting to be granted their turn at switch 312. Switch 312 will eventually send the command from the response buffer 310 to the RIRB engine 206.

The RIRB engine 206 receives the command and also receives information from the COS RIRB registers 314 and utilizes the information to send the command to COS RIRB memory space 316. COS RIRB memory space 316 is a portion of the greater COS memory space (212 in FIG. 2).

When a response command is received through frame receiving (Rx) logic 318, the command arrives at demultiplexer 312. In many embodiments, the command also arrives at decision engine 320, which determines whether the command is a response from the PAC 108. If the command is not a response from the PAC 108, the command is not let through the demultiplexer 312, in this situation commands from the VAC response buffer 310 are let through. If the command is a response from the PAC 108, then decision engine 320 allows the response to pass through demultiplexer 312 to the RIRB engine 206. The RIRB engine 206 sends the response command to either the COS RIRB memory 316 utilizing COS RIRB register 314 information or sends the response command to the SOS RIRB memory 324 utilizing information from the SOS RIRB registers 322 to find the correct location in memory space. The determination of whether the response command is sent to the COS or SOS is based on the destination codec for the response transfers.

As mentioned above, a write access to the CORB control register would be monitored by the command interpreter 216 to determine when the CORB DMA run bit is being set. The run bit enables the CORB DMA engine 206. Due to limitations in COS software, there may be a delay between when the COS software sends a command to the PAC 108 (which is intercepted by the SOS) and when the SOS programs the PAC 108 in response to that command. In some embodiments, the amount of time to wait may be predetermined and programmed accordingly by the BIOS. In some embodiments, the wait time may be up to 10 milliseconds. Thus, in addition to the run bit, in many embodiments, the DMA engines within COS VF0 and SOS VF1 will have a "wait" bit associated with them in a specific register. The bit will be set to '0' by default (which means no wait). In response to a write to the register by the COS VF0 (which would occur during a request initiated by the COS), the bit would turn to "1", which implements the wait. When the bit is set to "1", any additional writes to the register would be discarded. The bit would be reset to '0' by the SOS once the SOS has serviced the write event.

Figure 4:
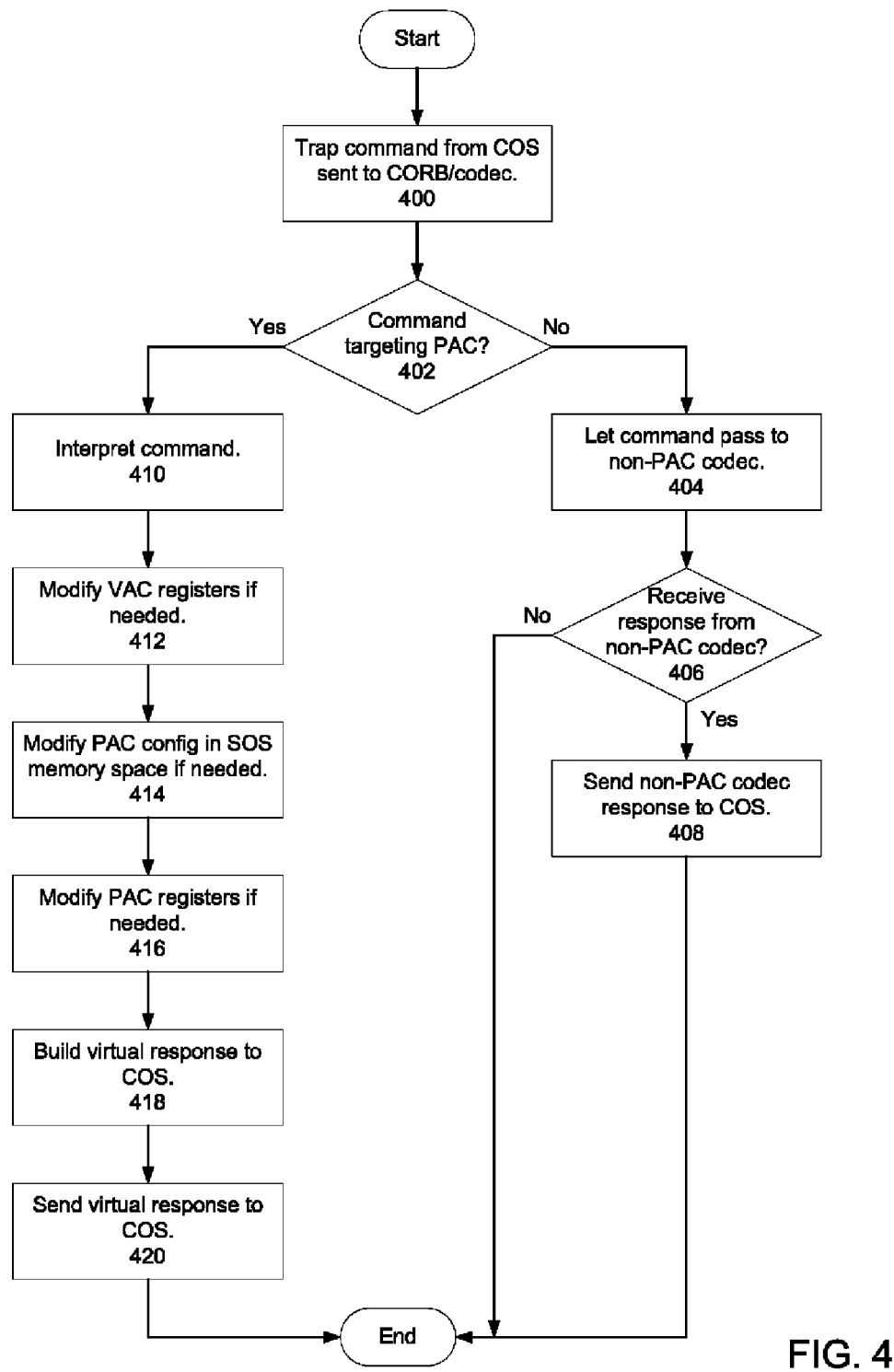
FIG. 4 is a flow diagram of one embodiment of a process to limit the direct access to a physical audio codec by a single virtual machine while providing a custom virtual interface to the physical audio codec for one or more other virtual machines.

FIG. 4 is a flow diagram of one embodiment of a process to limit the direct access to a physical audio codec by a single virtual machine while providing a custom virtual interface to the physical audio codec for one or more other virtual machines. The process is performed by processing logic that may comprise hardware, software, or a combination of both hardware and software. Turning to FIG. 4, the process begins by processing logic trapping a command from a COS (processing block 400) present in the system. This command is sent to the CORB engine in the audio controller in the system, thus the command is targeting a codec present within the system. Processing logic determines whether the command is specifically targeting the PAC or another codec (processing block 402). If the command is targeting another codec within the system, processing logic lets the command pass directly to the non-PAC codec through the CORB engine (processing block 404).

Some, but not all, commands sent to codecs are meant to illicit a response from that codec. Thus, processing logic will check for a response from the non-PAC codec (processing block 406). If no response is necessary the process is finished for that particular command, otherwise if a response does return from the non-PAC codec, processing logic sends the non-PAC codec response to the COS (processing block 408).

Now returning to processing block 402, if the command is specifically targeting the PAC, the processing logic interprets the command to determine what the response needs (processing block 410). Then processing logic will modify any VAC registers if needed (processing block 412). Processing logic will also modify the PAC configuration in SOS memory space if needed (processing block 414). Processing logic will also directly modify PAC registers if needed through SOS access to the PAC (processing block 416).

Then after making any modifications necessary to the PAC and VAC registers and SOS memory space (these steps are discussed in detail above in regard to FIGS. 2 and 3), processing logic will build a virtual response to the COS (processing block 418). Finally, processing logic will send the virtual response to the COS (processing block 420) and the process is finished. Thus, the process limits the direct access to the PAC by a single virtual machine (the SOS using processing logic within the VAC and the SOS itself) while providing a custom virtual interface to the PAC for one or more other virtual machines, namely the COS, though one or more additional COSs that require interaction with the PAC also can be provided with their own custom interface as discussed above.

Additionally, in many embodiments, the VAC processes many commands in parallel. In parallel processing embodiments, once processing logic interprets the command in processing block 410, two or more of the processing blocks from 412 to 420 may operate in parallel for different commands. Furthermore, processing blocks 412 through 420 do not necessarily have to be performed in the particular order as shown in FIG. 4 in these parallel processing embodiments.

Thus, embodiments of a method, device, and system to share the audio subsystem in a virtualized environment are described. These embodiments have been described with reference to specific exemplary embodiments thereof. It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

What is claimed is:

1. A device, comprising:
   system memory including:
   a first virtual machine to directly access a physical audio codec; and
   a virtual machine manager configured to manage separate allocations of memory to the first virtual machine and to one or more additional virtual machines; and
   an I/O host controller including a virtual audio codec, managed by the first virtual machine, to provide a custom interface to the physical audio codec for the one or more additional virtual machines, wherein the virtual audio codec comprises a set of virtual audio codec registers to maintain a copy of a set of configuration registers of the physical audio codec, and a decision engine to facilitate interaction with the first virtual machine.

2. The device of claim 1, wherein the virtual audio codec is further operable to trap one or more commands sent to the physical audio codec from at least one of the one or more additional virtual machines.

3. The device of claim 2, further comprising logic to monitor a command outbound ring buffer register and a response inbound ring buffer register to detect one or more accesses to the physical audio codec by at least one of the one or more additional virtual machines.

4. The device of claim 2, wherein the decision engine further comprises a command interpreter operable to translate the one or more trapped commands into one or more accesses to the set of virtual audio codec registers.

5. The device of claim 4, further comprising direct memory access logic to send the one or more accesses from the set of virtual audio codec registers to a location in a system memory reserved for the first virtual machine.

6. The device of claim 5, wherein the decision engine further comprises a codec emulator to
   receive the one or more accesses to the set of virtual audio codec registers; and
   manage the operation of the physical audio codec by responding to the received accesses.

7. The device of claim 1, wherein the decision engine further comprises an arbiter to
   resolve physical audio codec operational conflicts between requested accesses from one or more of the additional virtual machines;
   manage any interrupts affecting the physical audio codec; and
   manage unsolicited responses from the physical audio code.

8. The device of claim 2, wherein at least one of the one or more additional virtual machines includes a capability operating system operable to
   provide access to the virtual audio codec to one or more software applications running on the capability operating system, wherein the access is provided through one or more commands sent to the physical audio codec and trapped by the virtual audio codec.

9. The device of claim 1, wherein the first virtual machine further comprises a service operating system operable to
   manage the configuration of the physical audio codec; and
   manage the configuration of the virtual audio codec.

10. The device of claim 1, wherein the first virtual machine includes a first operating system and the one or more additional virtual machines each include corresponding one or more additional operating systems, and wherein the virtual audio codec is configured to arbitrate between the first operating system and the one or more additional operating systems to provide each of the first operating system and the one or more additional operating systems a portion of time to utilize each of one or more peripheral devices controlled by the physical audio codec.

11. The device of claim 1, wherein the virtual audio codec includes a first set of virtual audio codec registers corresponding to one or more peripheral devices coupled with the physcial audio codec, and additional sets of virtual audio codec registers corresponding to the one or more peripheral devices, wherein the first set of audio codec registers and the additional sets of virtual audio codec registers provide corresponding unique virtual copies of the one or more peripheral devices to each of the first virtual machine and the one or more additional virtual machines.

12. A method, comprising:
   managing a virtual audio codec by a first virtual machine residing i system memory to provide a custom interface to a physical audio codec for one or more additional virtual machines;
   maintaining a copy of a set of configuration registers of the physical audio codec in a set of virtual configuration registers of the virtual audio codec of an I/0 host controller;
   facilitating, by a decision engine of the virtual audio codec, interacting with the first virtual machine;

managing, by a virtual machine manager residing in the system memory, separate allocations of memory to the first virtual machine and to the one or more additional virtual machines; and directly accessing the first physical audio codec by the first virtual machine.

13. The method of claim 12, further comprising:

trapping one or more commands sent to the physical audio codec from at least one of the one or more additional virtual machines prior to the one or more commands arriving at the physical audio codec.

14. The method of claim 13, further comprising:

monitoring a command outbound ring buffer register and a response inbound ring buffer register to detect one or more accesses to the physical audio codec by at least one of the one or more additional virtual machines.

15. The method of claim 14, further comprising:

translating the one or more trapped commands into one or more accesses to the set of virtual audio codec registers; and managing the operation of the physical audio codec by responding to the translated commands.

16. A system, comprising:

system memory including:
- a first virtual machine to directly access a physical audio codec, and provide resources to a service operating system running on the first virtual machine, wherein the service operating system manages a virtual audio codec; and
- a virtual machine manager configured to manage separate allocations of memory to the first virtual machine and to one or more additional virtual machines; and an I/O host controller including the virtual audio codec, the virtual audio codec to provide a custom interface to the physical audio codec for the one or more additional virtual machines, wherein the virtual audio codec comprises a set of virtual audio codec registers to maintain a copy of a set of configuration registers of the physical audio codec, and a decision engine to facilitate interaction with the first virtual machine;

wherein the one or more additional virtual machines are configured to provide access to the virtual audio codec to one or more software application managed by at least one capability operating system running on at least one of the one or more additional virtual machines.

17. The system of claim 16, wherein the virtual audio codec is further operable to trap one or more commands sent to the physical audio codec from at least one of the one or more additional virtual machines prior to the one or more commands arriving at the physical audio codec.

18. The system of claim 17, further comprising logic to monitor a command outbound ring buffer register and a response inbound ring buffer register to detect one or more accesses to the physical audio codec by at least one of the one or more additional virtual machines.

19. The system of claim 17, wherein the decision engine further comprises a command interpreter operable to translate the one or more trapped commands into one or more accesses to the set of virtual audio codec registers.

20. The system of claim 19, further comprising direct memory access logic to send the one or more accesses from the set of virtual audio codec registers to a location in a system memory reserved for the first virtual machine.

21. The system of claim 20, wherein the decision engine further comprises a codec emulator to
- receive the one or more accesses to the set of virtual audio codec registers in the location in system memory reserved for the first virtual machine; and
- manage the operation of the physical audio codec by responding to the received accesses.

22. The system of claim 16, wherein the decision engine further comprises an arbiter to
- resolve physical audio codec operational conflicts between requested accesses from one or more of the additional virtual machines;
- manage any interrupts affecting the physical audio codec; and
- manage unsolicited responses from the physical audio code.

23. The system of claim 16, wherein the first virtual machine further comprises a service operating system operable to
- manage the configuration of the physical audio codec; and
- manage the configuration of the virtual audio codec.

24. The system of claim 23, wherein the service operating system is further operable to
- manage a voice-over-internet-protocol (VoIP) engine, the VoIP engine to utilize the physical audio codec through the service operating system.

* * * * *

UNITED STATES PATENT AND TRADEMARK OFFICE
CERTIFICATE OF CORRECTION

| | |
|---|---|
| PATENT NO. | : 8,250,573 B2 |
| APPLICATION NO. | : 11/965595 |
| DATED | : August 21, 2012 |
| INVENTOR(S) | : Singhal et al. |

It is certified that error appears in the above-identified patent and that said Letters Patent is hereby corrected as shown below:

Col. 10, line 59, "residing i system memory to provide a custom interface" -- should read -- residing in system memory to provide a custom interface --

Col. 11, line 5, "directly accessing the first physical audio codec by the first virtual machine." -- should read -- directly accessing the physical audio codec by the first virtual machine. --

Signed and Sealed this
Twenty-sixth Day of March, 2013

Teresa Stanek Rea
*Acting Director of the United States Patent and Trademark Office*